(12) United States Patent
James

(10) Patent No.: US 11,814,124 B1
(45) Date of Patent: Nov. 14, 2023

(54) SECUREMENT APPARATUS FOR CONNECTING RIDERS TOGETHER ON A VEHICLE

(71) Applicant: Jelani Nkosi James, Houston, TX (US)

(72) Inventor: Jelani Nkosi James, Houston, TX (US)

( * ) Notice: Subject to any disclaimer, the term of this patent is extended or adjusted under 35 U.S.C. 154(b) by 359 days.

(21) Appl. No.: 16/888,420

(22) Filed: May 29, 2020

Related U.S. Application Data

(60) Provisional application No. 62/856,397, filed on Jun. 3, 2019.

(51) Int. Cl.
*B62J 27/10* (2020.01)
*A62B 35/00* (2006.01)

(52) U.S. Cl.
CPC ........... *B62J 27/10* (2020.02); *A62B 35/0006* (2013.01); *A62B 35/0025* (2013.01); *A62B 35/00* (2013.01); *A62B 35/0037* (2013.01); *A62B 35/0056* (2013.01)

(58) Field of Classification Search
CPC . A62B 35/0006; A62B 35/00; A62B 35/0025; A62B 35/0037; A62B 35/0056; A01K 27/003; A01K 27/00; A01K 27/002; B62J 27/10; A47D 13/046; A47D 13/086; A63B 21/28; A41D 13/0007; B62B 5/068
USPC .......................................... 224/158; 119/770
See application file for complete search history.

(56) References Cited

U.S. PATENT DOCUMENTS

| | | | | |
|---|---|---|---|---|
| 3,004,519 A | * | 10/1961 | Weissman | A47D 15/006 182/4 |
| 3,088,700 A | * | 5/1963 | Carrey | B64D 17/38 244/151 A |
| 4,214,382 A | * | 7/1980 | Matsutani | A63B 71/0009 273/DIG. 27 |
| 5,076,598 A | * | 12/1991 | Nauman | A47D 13/086 224/160 |
| D332,589 S | * | 1/1993 | Frank | D12/114 |
| 5,375,861 A | * | 12/1994 | Gifford | B62B 5/068 280/47.38 |
| 5,692,456 A | * | 12/1997 | Louks-Phillips | A62B 35/0006 119/857 |
| 5,806,087 A | * | 9/1998 | Grotefend | A41F 9/005 2/311 |

(Continued)

FOREIGN PATENT DOCUMENTS

| | | | | | |
|---|---|---|---|---|---|
| CA | 2534444 A1 | * | 7/2007 | | A62B 35/0056 |
| CA | 2888271 A1 | * | 10/2016 | | A62B 35/0006 |
| CN | 111053985 A | * | 4/2020 | | A62B 35/0006 |

*Primary Examiner* — Taylor Morris
(74) *Attorney, Agent, or Firm* — Plager Schack LLP; Mark H. Plager, Esq.; Naomi Mann, Esq.

(57) ABSTRACT

A securement apparatus for connecting a plurality of riders together on a vehicle is provided. The securement apparatus includes a pair of harnesses having a first harness coupled to a first rider and a second harness coupled to a second rider, and a linkage assembly connecting the first and second harnesses together, the linkage assembly having a first arm with a first end coupled to the first harness and a second end, a pivot arm with a first end pivotably mounted to the second end of the first arm and a second end, and a third arm with a first end pivotably mounted to the second end of the pivot arm and a second end coupled to the second harness. The pivot arm is designed to pivotably adjust relative to the first and third arms to adjust the separation distance between the first and second harnesses.

12 Claims, 4 Drawing Sheets

(56) References Cited

U.S. PATENT DOCUMENTS

| | | | | |
|---|---|---|---|---|
| 6,343,824 B1* | 2/2002 | Foy | A44B 11/2519 | 24/579.11 |
| 6,523,643 B1* | 2/2003 | Rizza | A01M 31/02 | 182/187 |
| 6,644,438 B1* | 11/2003 | Chang | A63B 27/00 | 182/187 |
| 6,651,594 B1* | 11/2003 | Bagwell | A62B 35/0006 | 119/857 |
| 7,007,956 B1* | 3/2006 | Pinon | B62B 5/068 | 280/24 |
| 7,036,628 B2* | 5/2006 | Wilcox | A01M 31/02 | 119/857 |
| 7,096,545 B2* | 8/2006 | Uehara | A44B 11/266 | 24/615 |
| 7,163,081 B2* | 1/2007 | Muhich | A01M 31/02 | 119/857 |
| 7,311,313 B1* | 12/2007 | Ray | B62B 5/068 | 280/47.38 |
| 7,520,036 B1* | 4/2009 | Baldwin | A44B 11/2561 | 24/642 |
| 7,650,676 B2* | 1/2010 | Saitsu | A44B 11/2534 | 24/615 |
| 7,900,586 B2* | 3/2011 | Hamblen | A47D 13/086 | 119/857 |
| 8,181,318 B2* | 5/2012 | Anscher | A44B 11/266 | 24/640 |
| 8,434,722 B2* | 5/2013 | Fradet | B64D 17/64 | 244/148 |
| 9,694,219 B2* | 7/2017 | Hallmark | A62B 35/0025 | |
| 2006/0055128 A1* | 3/2006 | Scott | B62B 5/068 | 280/1.5 |
| 2006/0108756 A1* | 5/2006 | Kerr | B62B 5/068 | 280/33.992 |
| 2006/0254533 A1* | 11/2006 | Fuller | A62B 35/0006 | 119/770 |
| 2007/0290543 A1* | 12/2007 | James | B62J 27/10 | 297/468 |
| 2008/0296851 A1* | 12/2008 | Hall | B62B 5/068 | 280/1.5 |
| 2010/0089338 A1* | 4/2010 | Stern | A47D 13/086 | 119/770 |
| 2016/0360838 A1* | 12/2016 | Casebolt | A44B 11/065 | |

* cited by examiner

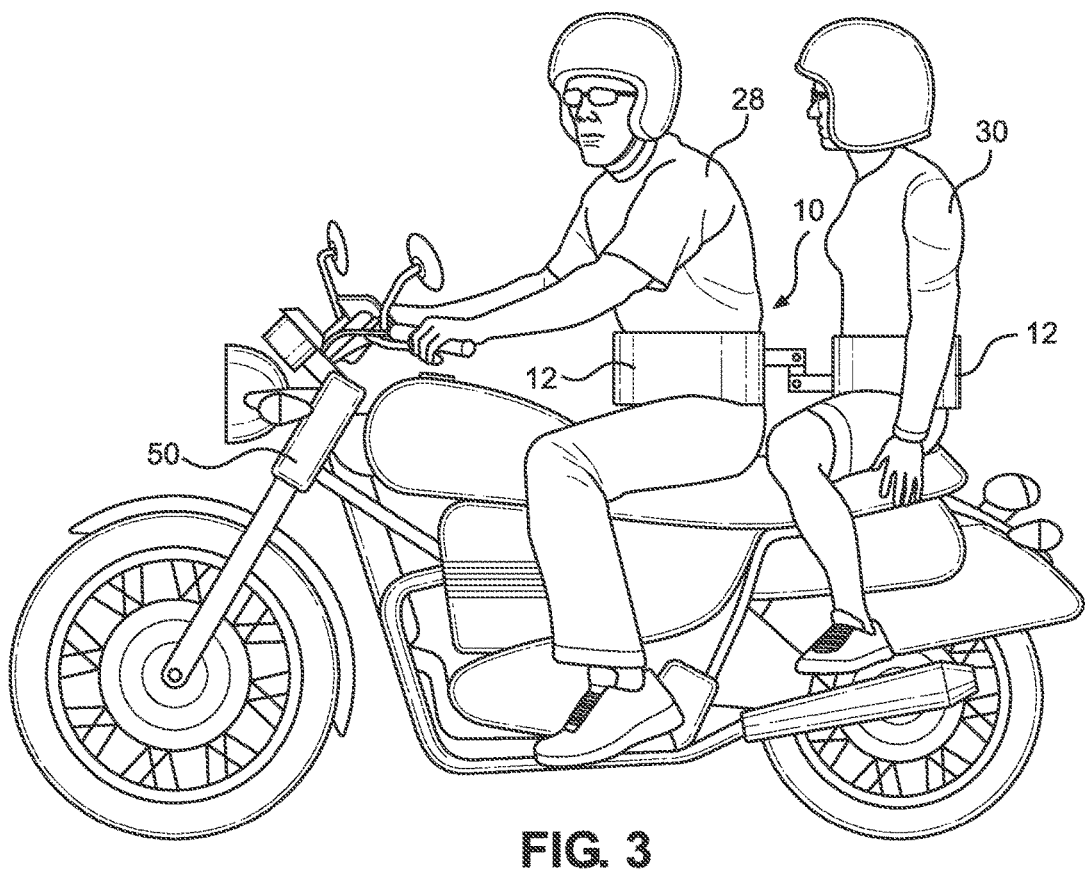
FIG. 3
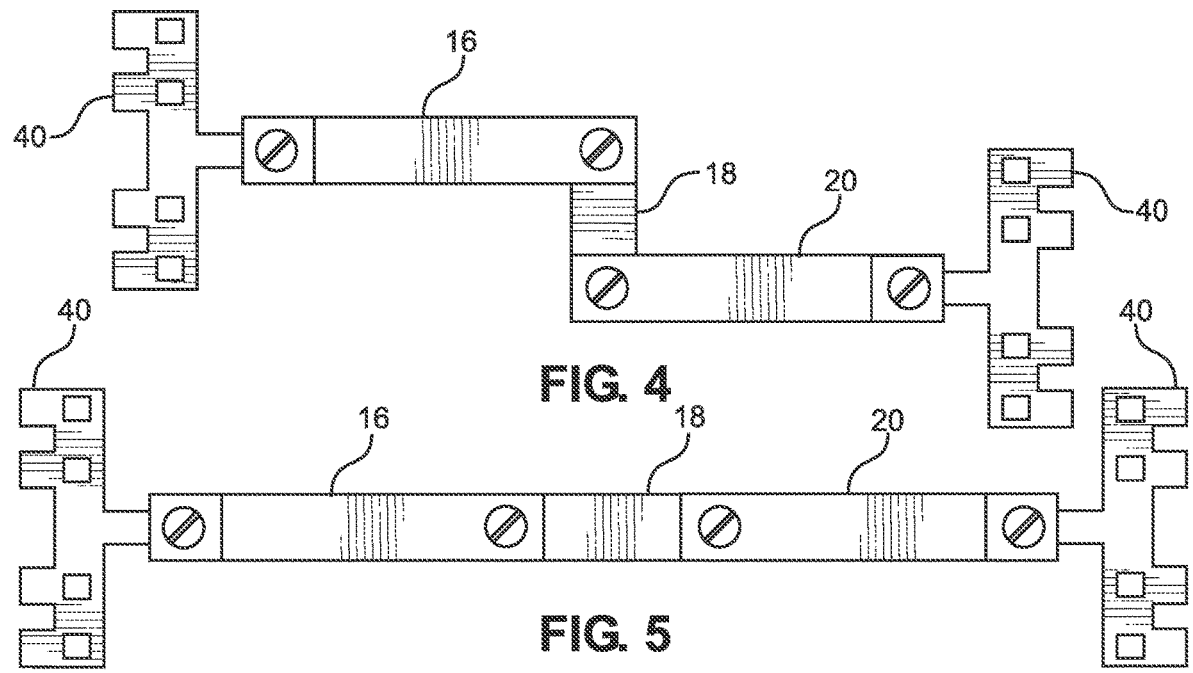
FIG. 4
FIG. 5

SECUREMENT APPARATUS FOR CONNECTING RIDERS TOGETHER ON A VEHICLE

RELATED APPLICATION

The application claims priority to provisional patent application U.S. Ser. No. 62/856,397 filed on Jun. 3, 2019, the entire contents of which is herein incorporated by reference.

BACKGROUND

The embodiments herein relate generally to a securement apparatus for connecting riders together on a vehicle.

Vehicles such as motorcycles, bikes and all-terrain vehicles often provide sufficient room for multiple riders. Typically, there is a driver who steers and controls the vehicle and a passenger who sits directly behind the driver. On a motorcycle, the passenger rider has to use both hands to hold on the driver to prevent falling off the motorcycle. This prevents the passenger from freeing up his/her hands and leads to fatigue over time.

As such, there is a need in the industry for a securement apparatus for connecting riders together on a vehicle that addresses the limitations of the prior art, which frees up the use of the passenger rider's hands and enhances safety by reducing the likelihood the passenger rider falls off the vehicle.

SUMMARY

In certain embodiments of the invention, a securement apparatus for connecting a plurality of riders together on a vehicle is provided. The securement apparatus comprises a pair of harnesses comprising a first harness configured to couple to a first rider in the plurality of riders and a second harness configured to couple to a second rider in the plurality of riders, and a linkage assembly connecting the first and second harnesses together, the linkage assembly comprising a first arm comprising a first end coupled to the first harness and a second end, a pivot arm comprising a first end pivotably mounted to the second end of the first arm and a second end, and a third arm comprising a first end pivotably mounted to the second end of the pivot arm and a second end coupled to the second harness, wherein the pivot arm is configured to pivotably adjust relative to the first and third arms to adjust a separation distance between the first and second harnesses, thereby enabling the second rider to move relative to the first rider.

BRIEF DESCRIPTION OF THE FIGURES

The detailed description of some embodiments of the invention will be made below with reference to the accompanying figures, wherein the figures disclose one or more embodiments of the present invention.

FIG. 3 depicts a side view of certain embodiments of the securement apparatus shown in use;

FIG. 4 depicts a side view of certain embodiments of the securement apparatus in a compressed position;

FIG. 5 depicts a side view of certain embodiments of the securement apparatus in an extended position;

DETAILED DESCRIPTION OF CERTAIN EMBODIMENTS

Figures 1, 2:
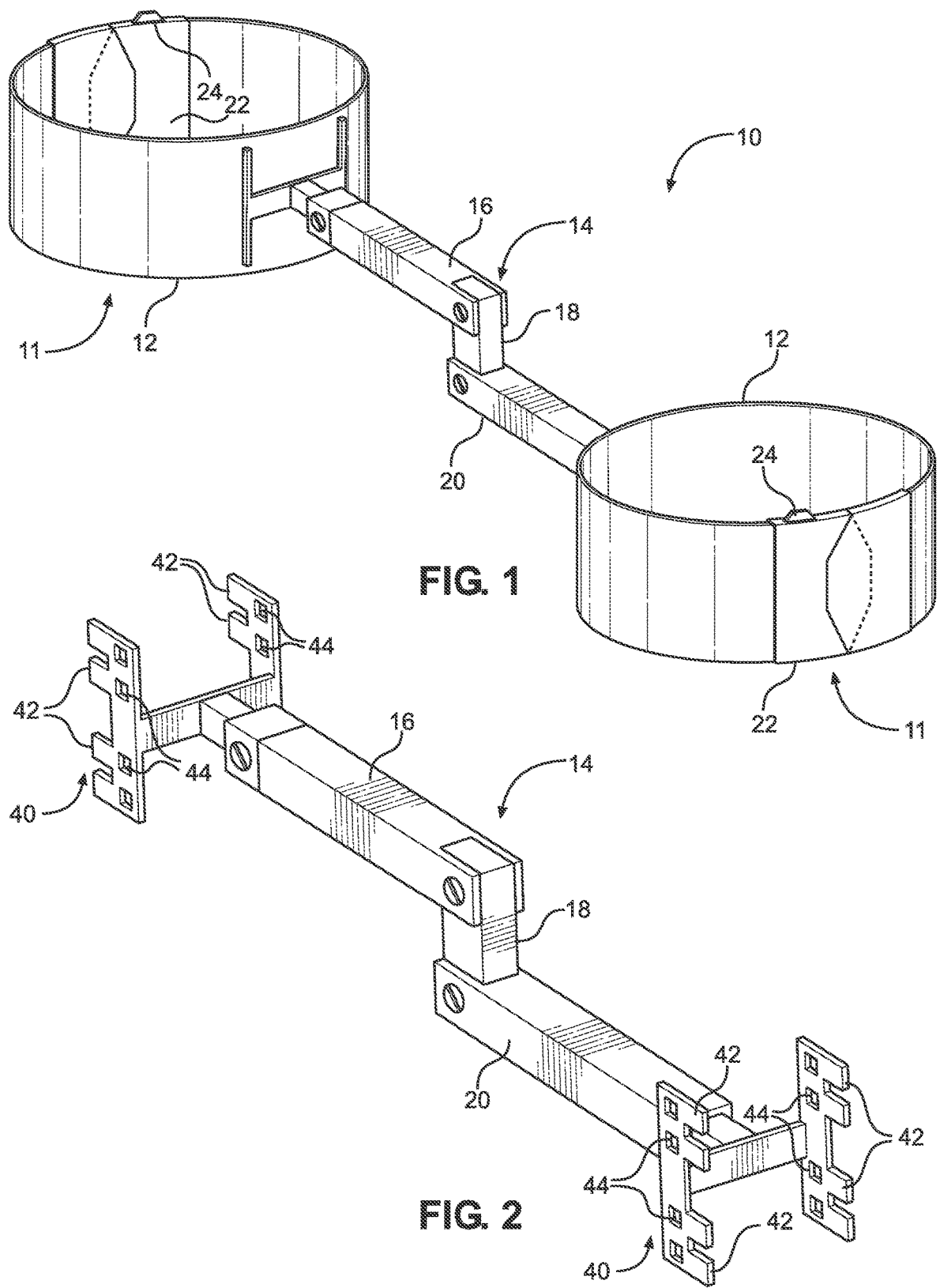
FIG. 1 depicts a perspective view of certain embodiments of the securement apparatus.
FIG. 2 depicts a perspective view of certain embodiments of the securement apparatus illustrating linkage assembly 14.

In certain embodiments as depicted in FIGS. 1-3, securement apparatus 10 is configured to secure a pair of riders together on any vehicle including, but not limited to, motorcycles, bikes, all-terrain vehicles, jet skis or other vehicles. In one embodiment as depicted in FIG. 3, securement apparatus 10 connects front rider 28 and rear rider 30 together on motorcycle 50.

In one embodiment, securement apparatus 10 generally comprises a pair of harnesses 11 connected together by linkage assembly 14. Securement apparatus 10 is configured to adjust to a compressed position and extended position to vary the separation distance between front and rear riders 28,30 to provide them freedom of movement. In an alternative embodiment, it shall be appreciated that securement apparatus 10 can secure riders on any other vehicles such as horses, camels or other animals.

Figure 10:
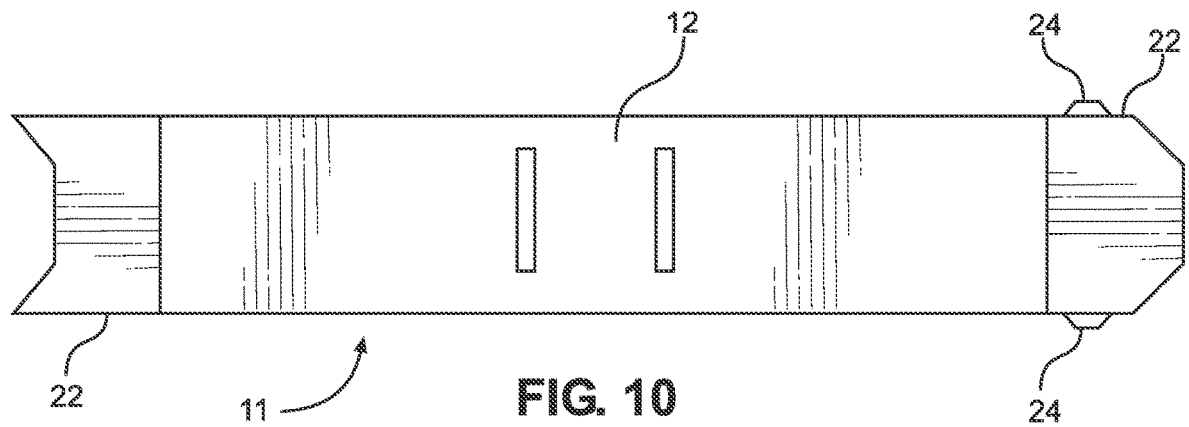
FIG. 10 depicts a front view of certain embodiments of the securement apparatus illustrating the harness in an open configuration.
Figure 11:
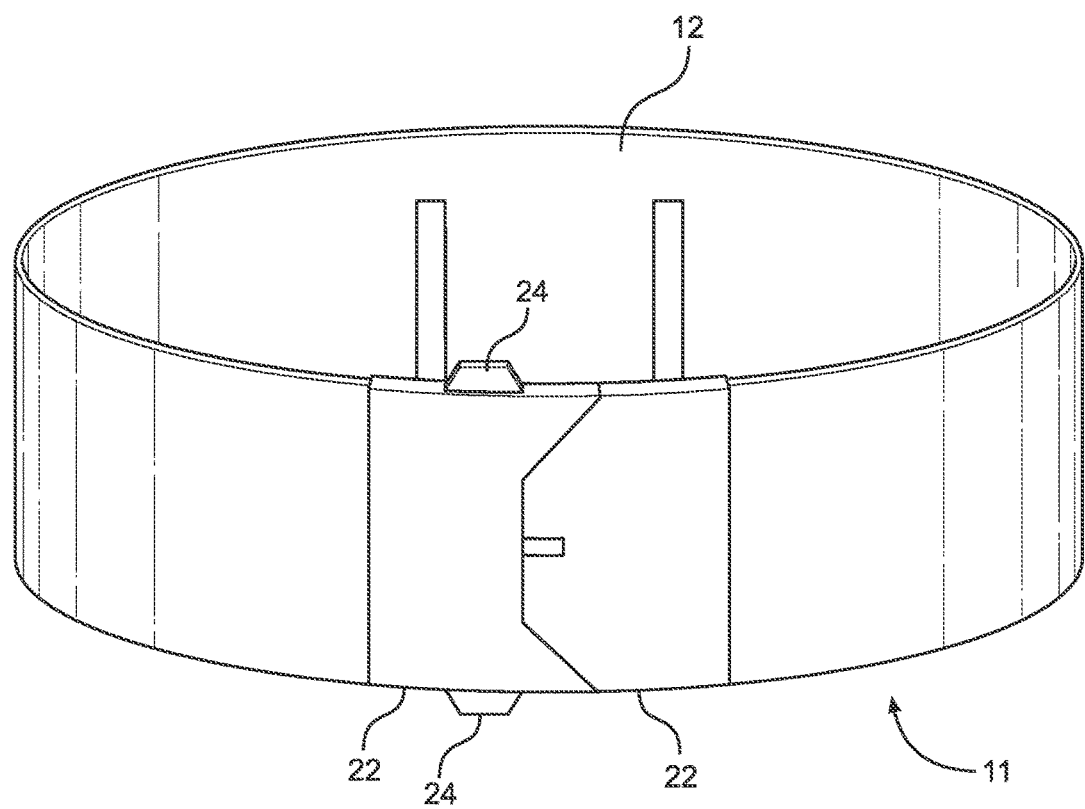
FIG. 11 depicts a perspective view of certain embodiments of the securement apparatus illustrating the harness in a closed configuration.

In one embodiment as depicted in FIGS. 1 and 10-11, each harness 11 of securement apparatus 10 generally comprises strap 12 comprising a first end and a second end that are detachably coupled together by buckle 22. Strap 12 is flexible and configured to be disposed around the waist region of the rider. Once disposed around the waist region of the rider, the first and second ends of strap 12 are coupled together by buckle 22. In one embodiment, strap 12 comprises protrusions 24 that serve as a secondary fastener in harness 11.

A pair of protrusions 24 is located on opposing upper and lower edges of strap 12 on a first buckle 22 side. Sliding the first and second ends of strap 12 together allows the pair of protrusions 24 to slide within the receiving buckle 22 side on the other end of strap 12. In the secured position as depicted in FIG. 11, the pair of protrusions 24 snap through a pair of openings in the upper and lower edges of the other end of strap 12. Protrusions 24 can easily snap in and out of the pair of openings in strap 12 to allow the first and second ends of strap 12 to attach and detach from each other.

In an alternative embodiment, the first and second ends of strap 12 can be attached together using other fasteners including, but not limited to, hook and loop fasteners, snap components, zippers or other fasteners. Straps 12 of harnesses 11 are made from any material in the field including, but not limited to, cotton, canvas, neoprene, elastic materials or other flexible materials. It shall be appreciated that the shape and dimensions of harness 11 can vary to accommodate users of all ages and sizes.

In one embodiment as depicted in FIGS. 1-2, first and second harnesses 11 are connected together by linkage assembly 14. In one embodiment, linkage assembly 14 comprises first arm 16, pivot arm 18, third arm 20 and end connectors 40. In one embodiment, first arm 16 comprises a first end with end connector 40 that is configured to couple to first harness 11. Pivot arm 18 comprises a first end pivotably mounted to the second end of first arm 16. Third arm 20 comprises a first end pivotably mounted to the second end of pivot arm 18 and a second end with end connector 40 that is configured to couple to second harness 11.

Pivot arm 18 pivotably adjusts relative to first arm 16 and third arm 20 by use of screws, pins, hinge components and the like. This pivotal movement of pivot arm 18 relative to first and third arms 16, 20 allows linkage assembly 14 to adjust to a compressed position as depicted in FIG. 4 or a fully extended position as depicted in FIG. 5. It shall be appreciated that first arm 16, pivot arm 18 and third arm 20 can be pivotably adjusted to be in any intermediate partially extended/compressed position in other embodiments.

In one embodiment as depicted in FIGS. 1-2 and 4-5, end connectors 40 are coupled to ends of first and third arms 16, 20 by screws, bolts, welds or other fastening components. In one embodiment as depicted in FIGS. 1-2 and 6-9, end connector 40 connects to locking device 34, which is secured to harness 11. In one embodiment, end connector 40 comprises a H-shaped member comprising a plurality of fingers 42. Each finger 42 comprises a corresponding recess 44. Fingers 42 and recesses 44 are configured to engage with locking device 34 on harness 11.

Figure 7:
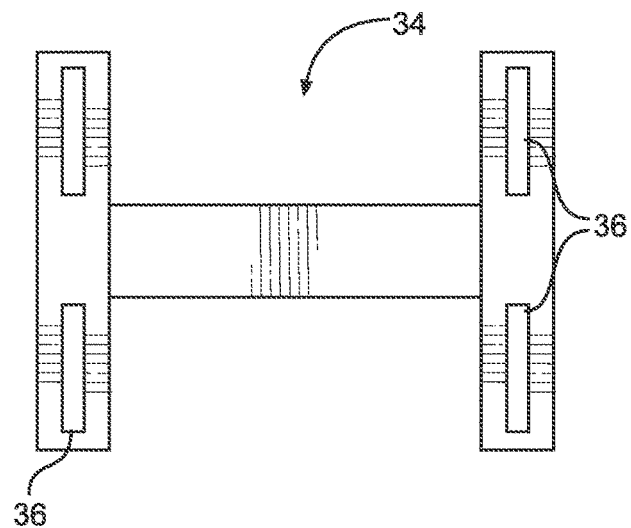
FIG. 7 depicts a front view of certain embodiments of the securement apparatus illustrating locking device 34.
Figure 8:
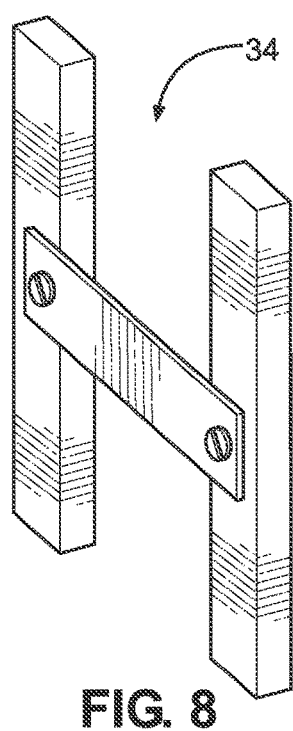
FIG. 8 depicts a rear perspective view of certain embodiments of the securement apparatus illustrating locking device 34.
Figure 9:
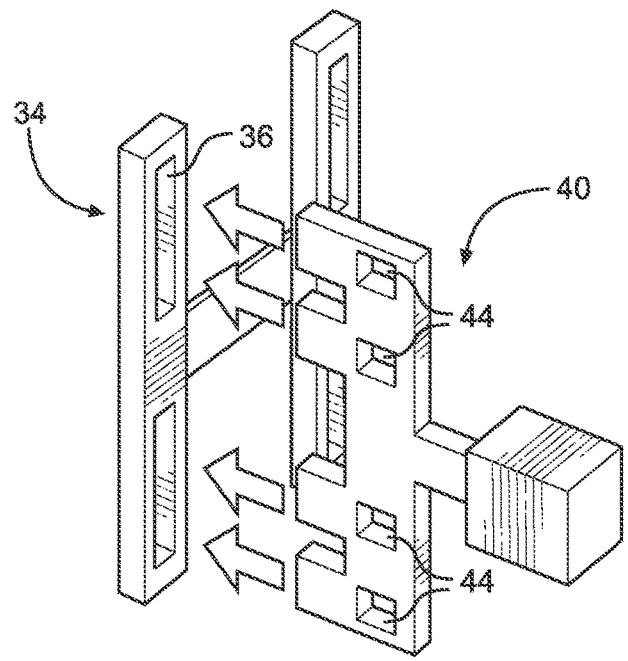
FIG. 9 depicts a perspective view of certain embodiments of the securement apparatus illustrating a simplified configuration of the engagement of the end of linkage assembly 14 with locking device 34.

In one embodiment as depicted in FIGS. 7-9, locking device 34 comprises a H-shaped member having a plurality of holes 36 that are configured to receive fingers 42 of end connector 40. It shall be appreciated that locking device 34 can have any number of bars, plates or members connected together using any fastening components in different embodiments. Locking device 34 is coupled to harness 11 using any fastening components.

Figure 6:
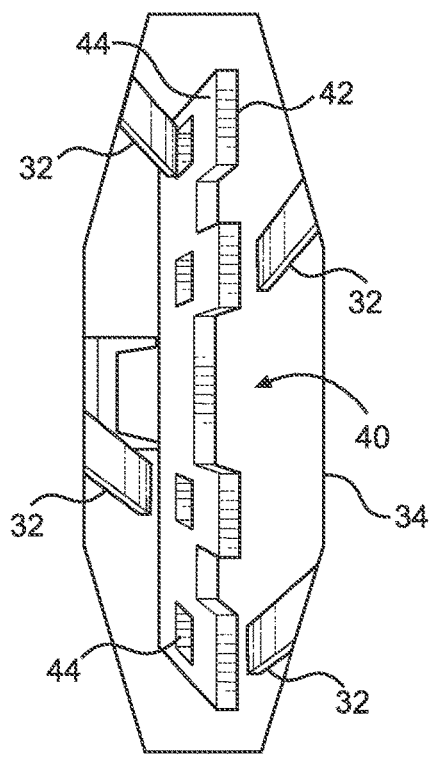
FIG. 6 depicts a perspective view of certain embodiments of the securement apparatus illustrating the engagement of an end of linkage assembly 14 with locking device 34.

In one embodiment as depicted in FIGS. 6 and 9, holes 36 in locking device 34 comprise a plurality of internal lock tabs 32. Lock tabs 32 are configured to engage with corresponding recesses 44 in fingers 42 of end connector 40. As such, first and third arms 16, 20 can be maneuvered to insert fingers 42 in holes 36 of locking device 34 to allow lock tabs 32 of locking device 34 to engage with recesses 44 of fingers 42 on end connector 40. Once engaged, linkage assembly 14 is secured to harness 11. To disengage linkage assembly 14 from locking device 34, end connector 40 is manually adjusted, such as with a push and pull motion, to allow lock tabs 32 of locking device 34 to disengage from recesses 44 of end connector 40. One disengaged, linkage assembly 14 detaches from harness 11.

In one embodiment, first arm 16, pivot arm 18, third arm 20, locking device 34 and end connectors 40 are made from any material or combination of materials sufficiently strong to secure front and rear riders 28, 30 together. This material may include, but is not limited to, stainless steel, other types of steel, titanium, other metals, high-strength plastic or other materials.

In operation, first and second harnesses 11 are secured to front and rear riders 28, 30 in one embodiment as depicted in FIG. 3. The pivotal movement of pivot arm 18 relative to first and third arms 16, 20 allow linkage assembly 14 to adjust to the fully compressed, fully extended or partially compressed/extended positions. This adjusts the separation distance between the pair of harnesses 11 to allow front and rear riders 28, 30 to move closer or farther away from each other.

Securement apparatus 10 is beneficial for a variety of reasons. The components allow front and rear riders 28, 30 to remain connected together on motorcycle 50 or any alternative vehicle to enhance rider safety. The freedom of movement of the riders as permitted by securement apparatus 10 is beneficial for accommodating the different positions of the driver rider and passenger rider when the vehicle is in the stationary, accelerating, braking and cruising modes. Securement apparatus 10 is also advantageous because it allows the free use of hands of rear rider 30, which traditionally have to be used to grasp front rider 28 or a portion of motorcycle 50 when the vehicle is in motion.

It shall be appreciated that the components of the securement apparatus described in several embodiments herein may comprise any alternative known materials in the field and be of any color, size and/or dimensions. It shall be appreciated that the components of the securement apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A securement apparatus for connecting a plurality of riders together on a vehicle, the securement apparatus comprising:
    a pair of harnesses comprising a first harness configured to couple to a first rider in the plurality of riders and a second harness configured to couple to a second rider in the plurality of riders; and
    a linkage assembly connecting the first and second harnesses together, the linkage assembly comprising a first arm comprising a first end coupled to the first harness and a second end, a pivot arm comprising a first end pivotably mounted to the second end of the first arm and a second end, and a third arm comprising a first end pivotably mounted to the second end of the pivot arm and a second end coupled to the second harness;
    wherein the pivot arm is configured to pivotably adjust relative to the first and third arms to adjust a separation distance between the first and second harnesses, thereby enabling the second rider to move relative to the first rider,
    wherein the first arm, the pivot arm, and the third arm are made of a rigid material, and wherein the pivot arm is configured to position the first arm and the third arm to be vertically offset while maintaining a horizontally parallel orientation with respect to one another, and
    wherein the first arm comprises a first arm length, the second arm comprises a second arm length, and the pivot arm comprises a pivot arm length, wherein the first arm length and the second arm length are each greater than the pivot arm length.

2. The securement apparatus of claim 1, wherein each harness in the first and second harnesses comprises a strap comprising a first end and a second end, the first and second ends of the strap configured to detachably couple together.

3. The securement apparatus of claim 2, further comprising a locking device coupled to each strap in the pair of harnesses.

4. The securement apparatus of claim 3, wherein each end in the first end of the first arm and the second end of the third arm comprises a plurality of fingers, the plurality of fingers configured to detachably couple to the locking device in one of the pair of harnesses.

5. The securement apparatus of claim 4, wherein each locking device comprises a plurality of holes configured to receive the plurality of fingers on one of the arms in the first and third arms, the plurality of holes in the locking device comprising a plurality of lock tabs therein.

6. The securement apparatus of claim 5, wherein each finger in the plurality of fingers on the first and third arms comprises a recess, the recess configured to engage with one of the plurality of lock tabs in the locking device.

7. The securement apparatus of claim 6, wherein the first and second ends of the strap in each harness in the first and second harnesses are coupled together by a buckle.

8. The securement apparatus of claim 7, wherein the strap in each harness in the first and second harnesses comprises a plurality of protrusions that lock the first and second ends of the strap together.

9. The securement apparatus of claim 1, where the first arm, the pivot arm, and the third arm are each a unitary piece.

10. The securement apparatus of claim 9, wherein a pivotal movement of the pivot arm relative to the first and third arm allows the linkage assembly to adjust between a compressed position and an extended position to adjust the separation distance between the first and second harnesses.

11. The securement apparatus of claim 1, wherein a connection between the first end of the first arm and the first harness is a rigid, non-pivotal connection.

12. The securement apparatus of claim 1, wherein a connection between the second end of the third arm and the second harness is a rigid, non-pivotal connection.

\* \* \* \* \*